United States Patent [19]
Kim et al.

[11] Patent Number: 5,934,817
[45] Date of Patent: Aug. 10, 1999

[54] COUPLING ARRANGEMENT FOR A VEHICLE DOOR LOCK ASSEMBLY

[75] Inventors: Tyler Kim, Novi, Mich.; Andrew J. Palmisano, Darien; James E. Marion, Bonfield, both of Ill.

[73] Assignee: Chrysler Corporation, Auburn Hills, Mich.

[21] Appl. No.: 09/096,932

[22] Filed: Jun. 12, 1998

[51] Int. Cl.[6] ............................................. E05B 9/08
[52] U.S. Cl. ..................... 403/196; 403/187; 403/302; 292/336.3; 74/500.5
[58] Field of Search ........................... 292/216, 201, 292/198, 221, 227, 336.3; 403/300, 302, 301, 309, 395, 399, 187, 196; 248/230.7, 229.26, 231.81; 74/500.5

[56] References Cited

U.S. PATENT DOCUMENTS

| | | |
|---|---|---|
| 3,795,416 | 3/1974 | Hehl et al. ............................ 292/336.3 |
| 4,381,656 | 5/1983 | Hayakawa ................................. 70/451 |
| 4,508,379 | 4/1985 | Mochida ................................ 292/336.3 |
| 4,842,312 | 6/1989 | Iwasaki et al. ........................ 292/336.3 |
| 4,886,309 | 12/1989 | Shimura ............................... 292/336.3 |
| 4,917,412 | 4/1990 | Swan et al. ........................... 292/216 X |
| 5,005,885 | 4/1991 | Kobayashi et al. .................... 292/336.3 |
| 5,253,906 | 10/1993 | Rogers, Jr. et al. ...................... 292/216 |
| 5,282,657 | 2/1994 | Clinch et al. ......................... 292/336.3 |
| 5,492,379 | 2/1996 | Staser et al. .......................... 292/336.3 |
| 5,769,471 | 6/1998 | Suzuki et al. ......................... 292/336.3 |

Primary Examiner—Lynne Reichard
Assistant Examiner—John R. Cottingham
Attorney, Agent, or Firm—Lawrence J. Shurupoff

[57] ABSTRACT

A coupling arrangement for connecting a vehicle door lock operator to a vehicle door lock, including a rod having an outer end connected to the door lock, and a hooked inner end. A clip has an outer end pivotally connected to the door lock operator. The clip has a hole between its ends in which the hooked inner end of the rod is engaged. The clip has a sleeve at its inner end for holding the rod engaged in the hole.

15 Claims, 3 Drawing Sheets

COUPLING ARRANGEMENT FOR A VEHICLE DOOR LOCK ASSEMBLY

This invention relates generally to vehicle door lock assemblies and more particularly to a coupling arrangement between a door lock and a door lock operator.

BACKGROUND AND SUMMARY OF THE INVENTION

In a typical vehicle door lock assembly, the coupling arrangement includes an elongated rod connecting the door lock to the door lock operator. One problem with this arrangement is that production workers have found it extremely difficult to connect the rod to the door lock operator. If the rod cannot be connected expeditiously, an entire production line is slowed down. What is needed is a means by which the rod may be connected to the door lock operator in a fast and efficient manner.

In accordance with the present invention, an extended clip is provided for connecting one end of the rod to the door lock operator. The clip has a recess between its ends in which an end of the rod may be engaged. The clip also has means for keeping the rod end engaged in the recess.

Preferably, the connection between the clip and the door lock operator is a pin on the end of the clip, the recess between the ends of the clip is a simple hole, and the means for retaining the end of the rod in the hole is a sleeve which encircles and grips the rod. The sleeve may be open at one side to permit the lateral insertion of the rod.

One object of this invention is to provide a coupling arrangement having the foregoing features and capabilities.

Another object is to provide a coupling arrangement which is of simple construction, is rugged and durable in use, can be inexpensively manufactured, and can be quickly and easily assembled and installed.

These and other objects, features and advantages of the invention will become more apparent as the following description proceeds, especially when considered with the accompanying drawings.

DETAILED DESCRIPTION OF THE PREFERRED EMBODIMENT

Figure 1:
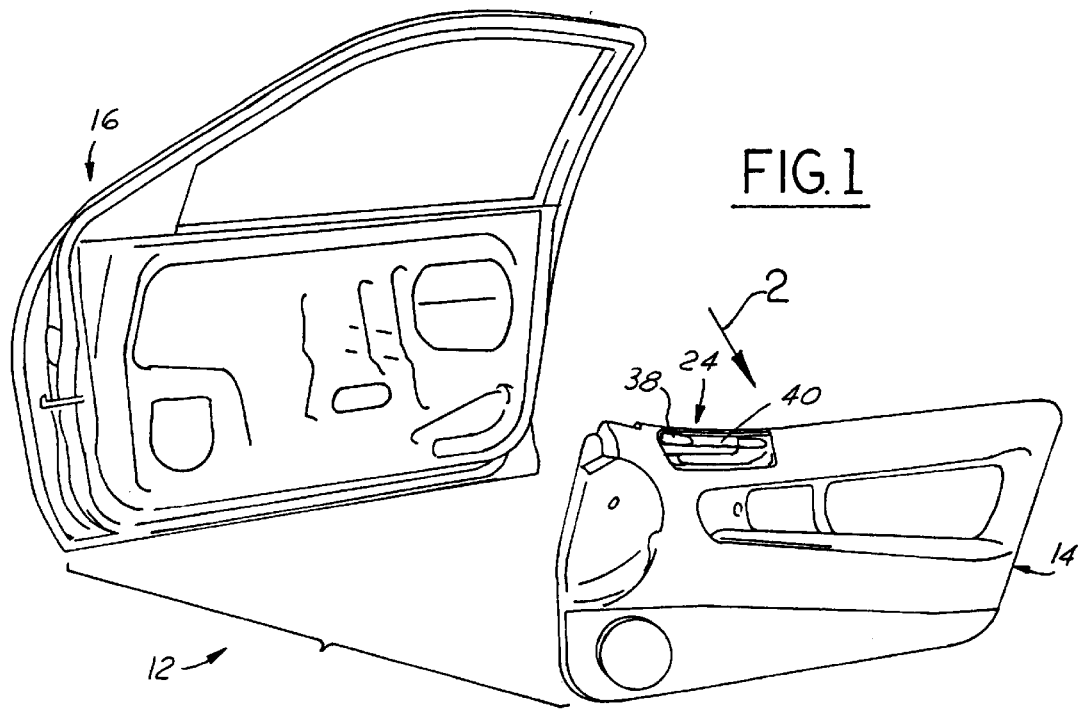
FIG. 1 is an exploded view of the inner and outer panels of a vehicle door having a coupling arrangement for a door lock assembly embodying the invention.

Referring now more particularly to the drawings, and especially FIGS. 1 to 4, a vehicle door 12 is shown having a trim panel 14 and a door inner panel 16. Secured to the inner side 18 of the trim panel 14 is a door lock assembly 20 including a door lock 22 and a door lock operator 24. A coupling arrangement 26 connects the door lock 22 and the door lock operator 24.

Figure 2:
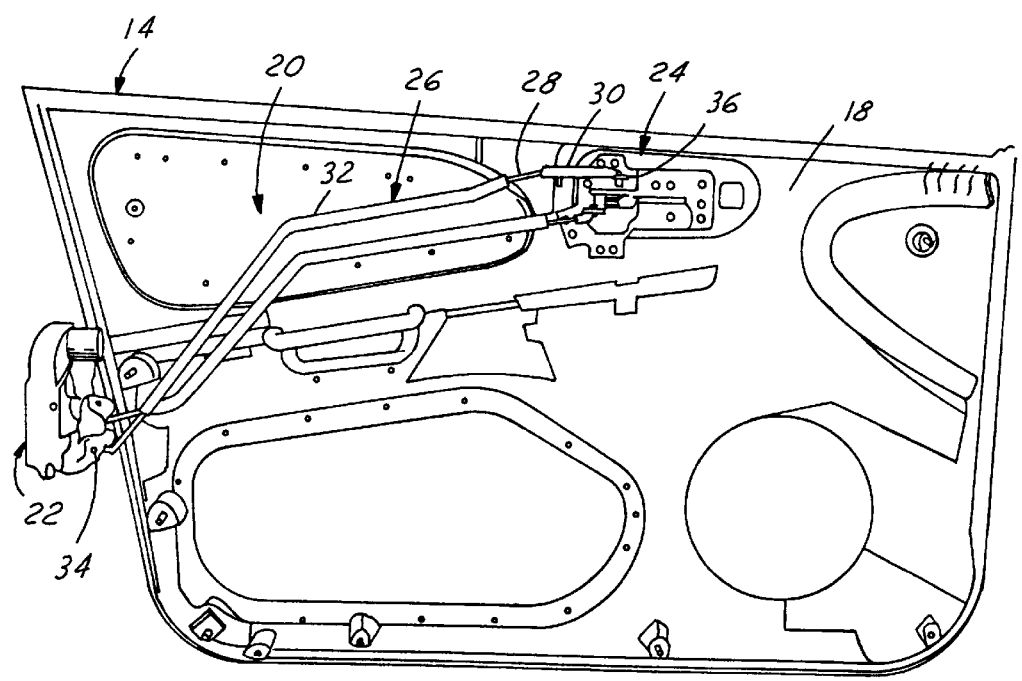
FIG. 2 is a side view taken in the direction of the arrow 2 in FIG. 1, of the inner side of the inner door panel showing a coupling arrangement between a door lock and a door lock operator, constructed in accordance with the invention.
Figure 4:
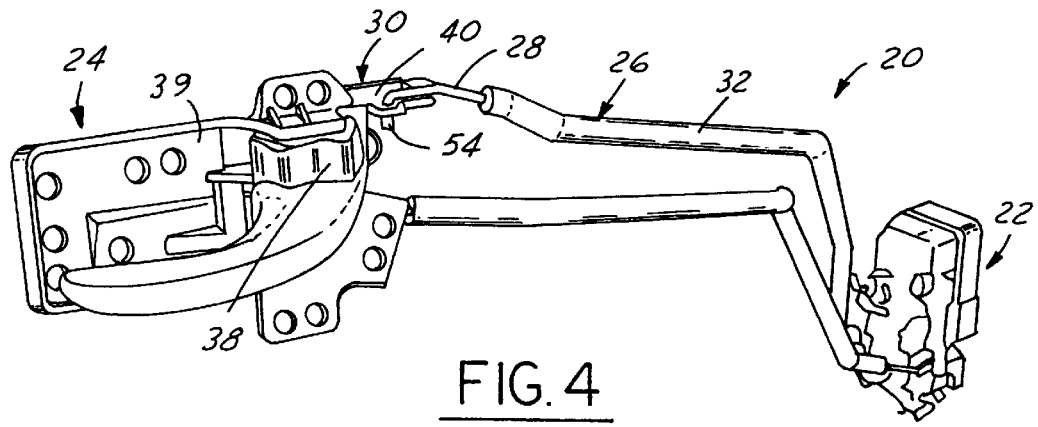
FIG. 4 is a view of the door lock, door lock operator and coupling arrangement as seen from the side opposite FIG. 3.
Figure 3:
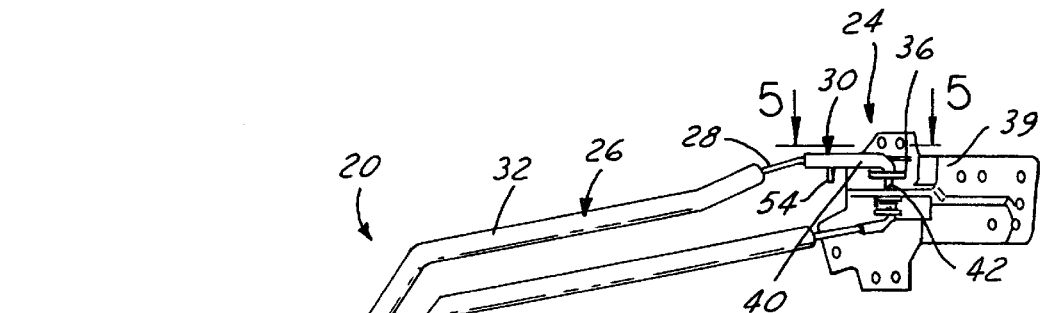
FIG. 3 is an enlarged view of the door lock, door lock operator and coupling arrangement shown in FIG. 2.
Figure 10:
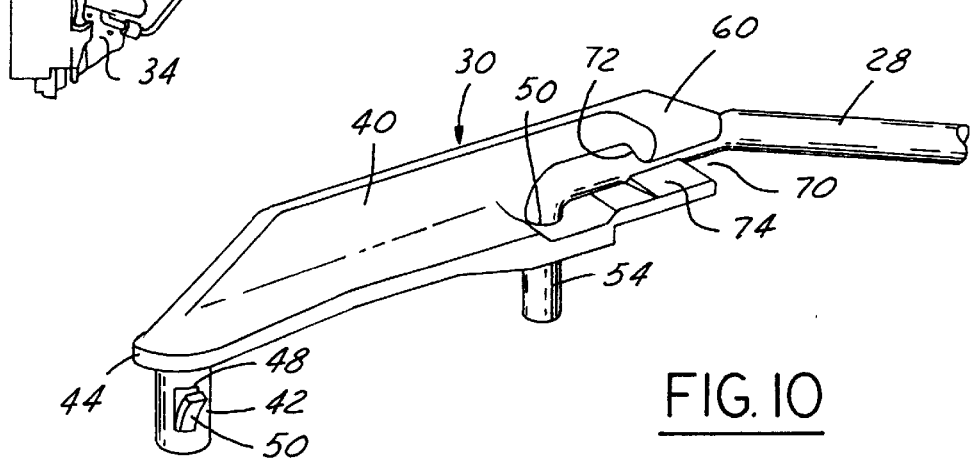
FIG. 10 is a perspective view showing the clip connected to the hooked end portion of the rod.
Figure 5:
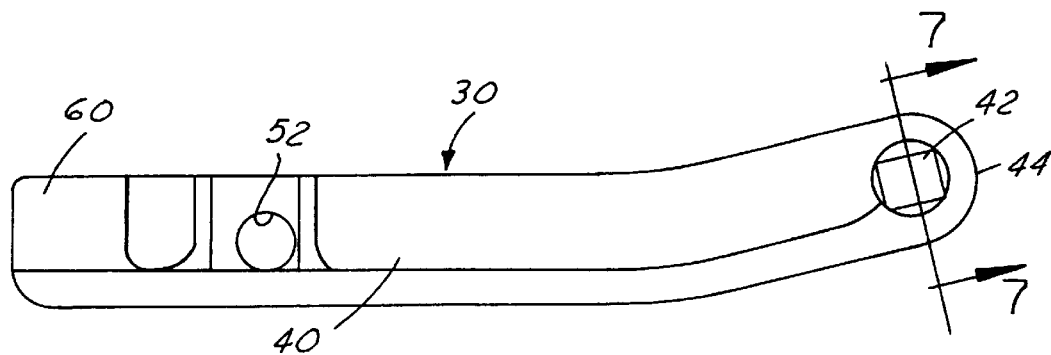
FIG. 5 is a top view of an extended clip forming part of the coupling arrangement, taken on the line 5—5 in FIG. 3.
Figure 6:
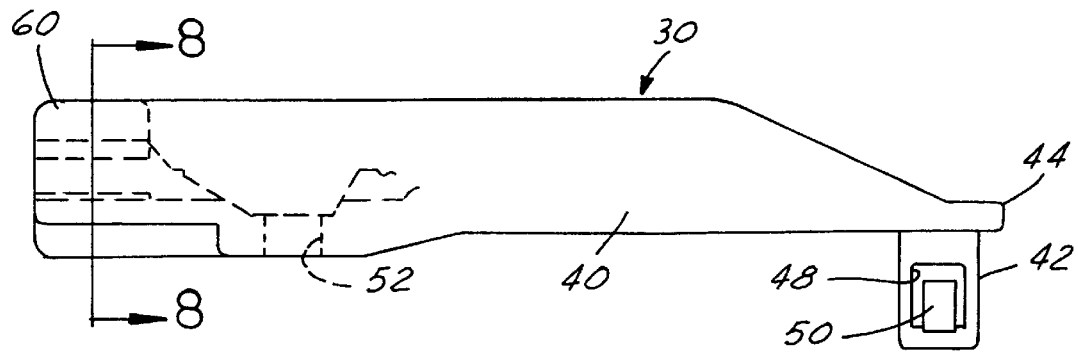
FIG. 6 is a side view of the clip shown in FIG. 5.
Figure 7:
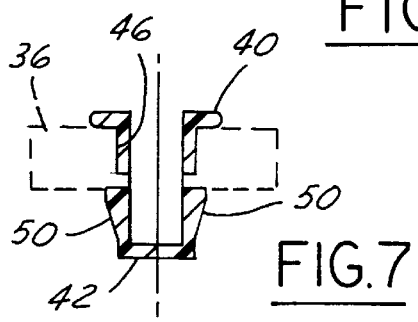
FIG. 7 is a sectional view taken on the line 7—7 in FIG. 5.
Figure 8:
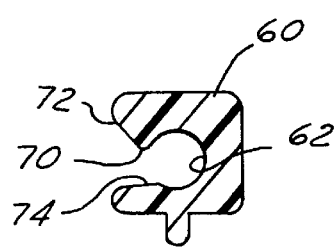
FIG. 8 is a sectional view taken on the line 8—8 in FIG. 6.
Figure 9:
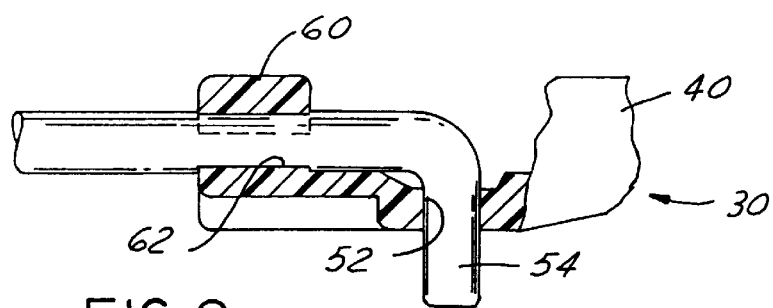
FIG. 9 is fragmentary view, with parts in section, of a portion of FIG. 6.

Referring to FIGS. 2–4, the coupling arrangement 26 includes an elongated rod 28 and an extended clip 30. The rod is covered by a tubular protective sheath 32. The outer end of the rod 28 is connected in a suitable manner to a locking element 34 of the door lock 22. The inner end of the rod 28 is connected to the clip 30 in a manner to be described. The clip is pivoted to a projecting plate 36 on a finger-actuated lock operator element 38 (FIGS. 1 and 4) in a manner to be described, element 38 being pivoted to a frame 39 of the lock operator 24. Pivoting the lock operator element 38 in one direction extends the rod 28 to extend the locking element 34 and lock the door. Pivoting the lock operator element 38 in the opposite direction retracts the rod 28 to retract the locking element 34 and unlock the door.

Referring to FIGS. 5–10, the clip 30 has an elongated body 40. An integral hollow pin 42 on the outer end 44 of the body extends through and is pivoted in a hole 46 in the projecting plate 36 of the finger-operated lock operator element 38. The pin 42 has a transverse hole 48. Integral tangs 50 on opposite sides of the pin project up from the bottom of the hole 48 and flare outwardly to capture the plate 36 of the lock operator element 38 between the tops of the tangs and the bottom of the body 40 of the clip. The clip 30 is made of a suitable flexible material, preferably plastic, so that the tangs 50 can be cammed inwardly when pressing the pin 42 into the hole 46.

The clip 30 has a recess in the form of a hole 52 between the ends of the body 40. The rod 28 has a right angle bend at the inner end forming a hook 54 which extends through the hole 52. The body 40 has an integral sleeve 60 on its inner end defining a cylindrical thorough-passage 62 the axis of which is parallel to the lengthwise dimension of the body. The rod 28 extends lengthwise through the sleeve 60. The diameter of the rod 28 is the same as the internal diameter of the sleeve 60, so that the sleeve will firmly grip the rod and prevent the hooked end thereof from pulling out of the hole 52. The sleeve is longitudinally split at one side to provide an opening 70 of slightly less width than the diameter of the rod so that the rod may pressed laterally into the sleeve. Spaced, confronting guide surfaces 72 and 74 at opposite sides of the opening 70 taper radially inwardly to guide the rod when pressed into the sleeve.

To install and assemble the coupling arrangement 26, the outer end of the rod 28 is connected to the locking element 34 of the door lock 22. The pin 42 on the outer end of the body of the clip 30 is pressed into the hole 46 in the projecting plate 36 of the lock operator element 38. The inner hooked end 54 of the rod 28 is then inserted into the hole 52 in the clip while the rod is laterally inserted into the sleeve 60. The clip 30 is capable of being rotated as necessary about the axis of its pin 42 to accomplish this latter movement.

What is claimed is:

1. A coupling arrangement for connecting a vehicle door lock operator device to a vehicle door lock device comprising, an elongated rod having an outer end adapted to be connected to one of said devices and also having an inner end, and an elongated a monolithically formed one piece clip having an outer end adapted to be connected to the other of said devices and also having an inner end, said clip having a recess between the ends thereof in which the inner end of said rod is engaged, said clip having means at said inner end for holding said rod engaged in said recess; and said clip having a pivot pin provided on said outer end of said clip and spaced apart from said recess and said inner end of said rod.

2. A coupling arrangement as in claim 1, wherein said one of said devices is said door lock device and said other of said devices is said door lock operator device.

3. A coupling arrangement as in claim 2, wherein said inner end of said rod forms a hook.

4. A coupling arrangement as in claim 2, wherein said recess comprises a hole.

5. A coupling arrangement as in claim 2, wherein said means for holding said rod engaged in said recess comprises a sleeve through which said rod extends.

6. A coupling arrangement as in claim 5, wherein said sleeve is longitudinally split to provide an opening for the lateral insertion of said rod.

7. A coupling arrangement as in claim 6, wherein said sleeve has spaced, confronting guide surfaces at opposite sides of said opening to guide said rod when the rod is laterally inserted through said opening into said sleeve.

8. A coupling arrangement as in claim 7, wherein said inner end of said rod forms a hook and said recess comprises a hole.

9. A coupling arrangement as in claim 8, wherein said outer end of said clip has a pin rotatably receivable in a hole in said door lock operator.

10. In a vehicle door lock assembly wherein a door lock operator device operates a door lock device by a coupling arrangement including an elongated rod extending therebetween, the improvement comprising, an elongated a monolithically formed one piece clip for connecting said rod to one of said devices, said clip having outer and inner ends, said clip having a pivot pin at said outer end engageable with said one of said devices, said clip having a recess between said ends and spaced apart from said pivot pin for engaging an end of said rod, said clip having a sleeve at the inner end thereof for holding the end of said rod engaged in said recess and spaced apart from said pivot pin.

11. In a vehicle door lock assembly as in claim 10, wherein said one of said devices is said door lock operator device.

12. In a vehicle door lock assembly as in claim 11, wherein said recess comprises a hole.

13. In a vehicle door lock assembly as in claim 10, wherein said sleeve is longitudinally split to provide an opening for the lateral insertion of said rod.

14. In a vehicle door lock assembly as in claim 13, wherein said sleeve has spaced, confronting guide surfaces at opposite sides of said opening to guide said rod when said rod is laterally inserted through said opening into said sleeve.

15. In a vehicle door lock assembly as in claim 14, wherein said recess comprises a hole.

* * * * *